US010834474B2

United States Patent
Levine et al.

(10) Patent No.: US 10,834,474 B2
(45) Date of Patent: Nov. 10, 2020

(54) SYSTEM AND METHOD TO MANAGE A CONTENT STREAM

(71) Applicant: AT&T Intellectual Property I, L.P., Atlanta, GA (US)

(72) Inventors: David A. Levine, Smyrna, GA (US); Dale Malik, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 235 days.

(21) Appl. No.: 15/681,525

(22) Filed: Aug. 21, 2017

(65) Prior Publication Data

US 2017/0359625 A1 Dec. 14, 2017

Related U.S. Application Data

(63) Continuation of application No. 14/609,043, filed on Jan. 29, 2015, now Pat. No. 9,769,535, which is a continuation of application No. 13/625,399, filed on Sep. 24, 2012, now Pat. No. 8,973,079, which is a continuation of application No. 12/274,907, filed on Nov. 20, 2008, now Pat. No. 8,302,145.

(51) Int. Cl.
| | |
|---|---|
| *H04N 21/6377* | (2011.01) |
| *H04N 21/442* | (2011.01) |
| *H04N 7/173* | (2011.01) |
| *H04N 21/2385* | (2011.01) |
| *H04N 21/239* | (2011.01) |
| *H04N 21/422* | (2011.01) |
| *H04N 21/443* | (2011.01) |
| *H04N 21/643* | (2011.01) |

(52) U.S. Cl.
CPC ......... *H04N 21/6377* (2013.01); *H04N 7/173* (2013.01); *H04N 21/2385* (2013.01); *H04N 21/2393* (2013.01); *H04N 21/42204* (2013.01); *H04N 21/4436* (2013.01); *H04N 21/44231* (2013.01); *H04N 21/64322* (2013.01)

(58) Field of Classification Search
CPC ............... H04N 21/6377; H04N 7/173; H04N 21/2385; H04N 21/2393; H04N 21/42204; H04N 21/44231; H04N 21/4436; H04N 21/64322; H04N 21/4432; H04N 21/40; G06F 9/4418; G06F 1/3203
See application file for complete search history.

(56) References Cited

U.S. PATENT DOCUMENTS

| | | | |
|---|---|---|---|
| 8,302,145 | B2 | 10/2012 | Levine et al. |
| 8,973,079 | B2 | 3/2015 | Levine et al. |
| 9,769,535 | B2 * | 9/2017 | Levine .................. H04N 7/173 |

(Continued)

*Primary Examiner* — Ngoc K Vu
(74) *Attorney, Agent, or Firm* — Guntin & Gust, PLC; Mark Wilinski

(57) ABSTRACT

A method of managing bandwidth usage at a customer premises includes receiving a content stream at a set-top box device coupled to a display device. The method also includes receiving a power-off command for the display device. Furthermore, the method includes displaying a prompt on the display device, wherein the prompt comprises an instruction to confirm that the display device is active via a confirmation input. The method further includes directing, responsive to the determining that the confirmation input has not been received, a source device to cease sending the content stream to the set-top box.

20 Claims, 9 Drawing Sheets

(56) References Cited

U.S. PATENT DOCUMENTS

| | | |
|---|---|---|
| 2004/0214617 A1* | 10/2004 | Kanazawa .......... H04L 12/2823 |
| | | 455/574 |
| 2005/0157215 A1 | 7/2005 | Minnick et al. |
| 2005/0162282 A1 | 7/2005 | Dresti et al. |
| 2006/0109384 A1* | 5/2006 | Miller-Smith ........... H04N 5/63 |
| | | 348/730 |
| 2006/0114360 A1 | 6/2006 | Kortum et al. |
| 2007/0044119 A1 | 2/2007 | Sullivan et al. |
| 2008/0148307 A1 | 6/2008 | Nielsen et al. |
| 2009/0064252 A1 | 3/2009 | Howarter et al. |
| 2009/0091192 A1 | 4/2009 | Robertson et al. |
| 2010/0274372 A1 | 10/2010 | Nielsen et al. |

\* cited by examiner

SYSTEM AND METHOD TO MANAGE A CONTENT STREAM

CROSS-REFERENCE TO RELATED APPLICATIONS

This application is a continuation of and claims priority to U.S. patent application Ser. No. 14/609,043, filed Jan. 29, 2015, which is a continuation of and claims priority to U.S. application Ser. No. 13/625,399, filed Sep. 24, 2012, now U.S. Pat. No. 8,973,079, which is a continuation of U.S. patent application Ser. No. 12/274,907 filed Nov. 20, 2008, now U.S. Pat. No. 8,302,145 which issued on Oct. 30, 2012, the disclosures of each of which are incorporated herein by reference in their entirety.

FIELD OF THE DISCLOSURE

The present disclosure generally relates to communications networks, and more particularly relates to managing a content stream.

BACKGROUND

Telecommunications service providers can offer an array of services to customers. A single service provider can provide telecommunications services including Internet Protocol Television (IPTV) services, telephone services and Internet services over a broadband data connection to a customer premises. Each service requires a portion of the total bandwidth available over the data connection.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION

Figure 1:
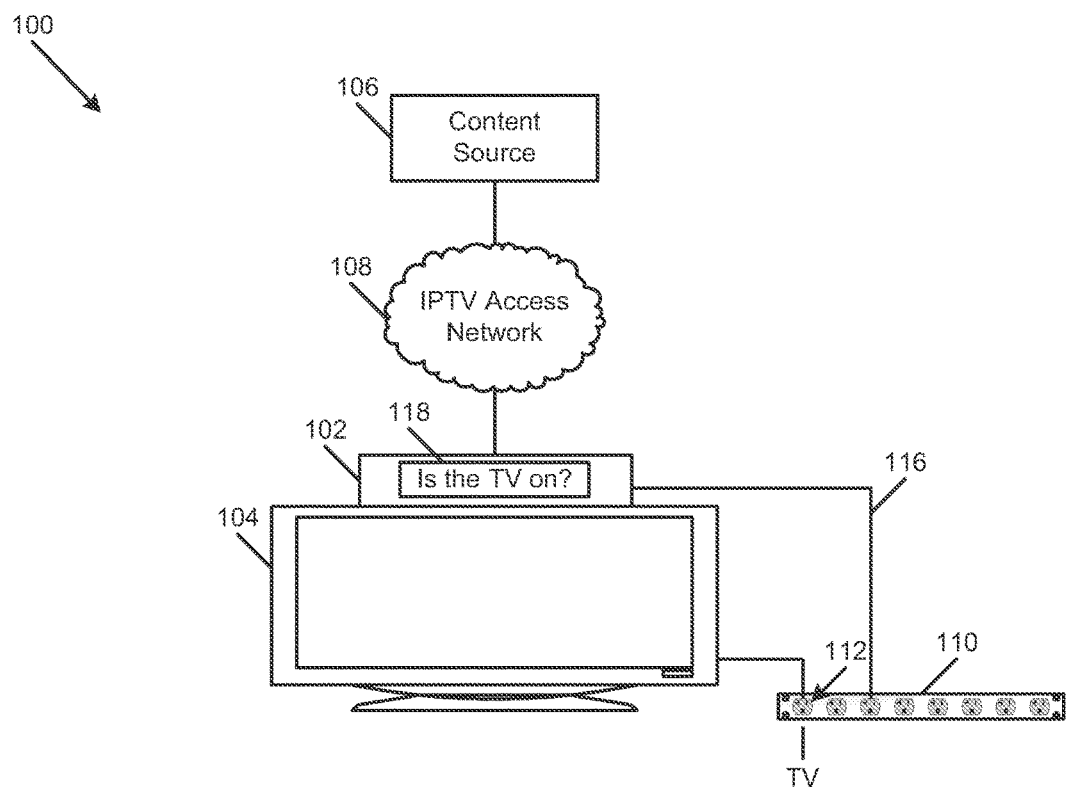
FIG. 1 is a block diagram illustrating a particular embodiment of a system to manage a content stream.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed systems, methods or computer-readable media. Moreover, some statements may apply to some inventive features but not to others.

In one embodiment, a method of managing a content stream includes receiving the content stream at a set-top box device coupled to a display device. The method also includes receiving a signal at the set-top box device from an external power interface. The signal indicates that a low power state has been detected at a power outlet of the external power interface, the power outlet associated with the display device. Further, the method includes sending a signal to a source of the content stream in response to receiving the signal indicating the low power state. The signal indicates that the source is to cease sending the content stream to the set-top box device.

In another embodiment, a method of managing a content stream includes detecting a power-off command issued by a remote control device associated with a display device coupled to a set-top box device. The method also includes outputting a prompt to indicate whether the display device is in a powered-on state in response to detecting the power-off command and sending a signal to a source of the content stream after determining that the display device is not in a powered-on state. The signal indicates that the source is to cease sending the content stream to the set-top box device.

In yet another embodiment, a set-top box device includes processing logic and memory accessible to the processing logic. The memory includes instructions executable by the processing logic to receive a content stream from a content source via an access network of an Internet Protocol Television system. The memory also includes instructions executable by the processing logic to receive a signal from an external power interface. The signal indicates that a low power state has been detected at a power outlet of the external power interface, the power outlet associated with the display device. The memory also includes instructions executable by the processing logic to send a signal to the content source via the access network, the signal indicating that the content source is to cease sending a content stream to the set-top box device.

In yet another embodiment, a set-top box device includes processing logic and memory accessible to the processing logic. The memory includes instructions executable by the processing logic to detect a power-off command via a wireless interface coupled to or integrated with the set-top box device, the power-off command issued by a remote control device associated with a display device coupled to the set-top box device. Further, the memory includes instructions executable by the processing logic to send a signal to a source of the content stream after determining that the display device is not in a powered-on state, the signal indicating that the source is to cease sending the content stream to the set-top box device.

In a further embodiment, a computer-readable medium includes processor-readable instructions executable by processing logic to execute a method, the method comprising receiving a content stream at a set-top box device coupled to a display device; receiving a signal at the set-top box device from an external power interface, the signal indicating that a low power state has been detected at a power outlet of the external power interface, the power outlet associated with the display device; and sending a second signal to a source of the content stream, the second signal indicating that the source is to cease sending the content stream to the set-top box device.

FIG. 1 illustrates a particular embodiment of a system 100 to manage a content stream. The system 100 includes a set-top box device 102 coupled to a display device, such as a television 104. The set-top box device 102 communicates with a content source 106, such as a video head-end of a video service provider, via a private access network, such as an Internet Protocol Television (IPTV) access network 108. The system 100 also includes a power interface external to the set-top box device 102 and the television 104, such as the power strip 110, through which the television 104 can receive electrical power. The set-top box device 102 can also receive power via the power strip 110. The power strip 110 includes at least one power outlet 112 through which power to a device coupled to the power outlet 112 can be monitored.

In a particular embodiment, the set-top box 102 device is adapted to receive a content stream, such as a video stream, an audio stream, or a combination thereof, from the content source 106 via the IPTV access network 108. The set-top box device 102 can be adapted to send the content stream to the television 104 after decoding the content stream, buffering the content stream, otherwise processing the content stream, or any combination thereof. In addition, the set-top box device 102 is adapted to determine whether it has received a low power state indicator from the external power interface 110. The low power state indicator can indicate that a device coupled to the power outlet 112 has entered a low power state, such as a powered-off state, a standby state, an unplugged state or other low power state.

In the embodiment illustrated in FIG. 1, the external power interface 110 can include a current sensor, another component adapted to monitor electrical power or current associated with equipment connected to the power outlet 112 via a power cable, or a combination thereof. For example, the external power interface 110 can include a component adapted to detect a reduced current or power draw, an approximately zero current or power draw, or another indication that the television 104 has been powered off or has been placed in a standby mode, at the power outlet 112. The set-top box device 102 is adapted to receive a low power state indicator from the external power interface 110. For instance, the external power interface 110 can be adapted to send a low power state indicator to the set-top box device 102 via a power cable 116, using X10 protocol or another method. In some embodiments, the external power interface 110 can be adapted to detect a high power state, such as a powered-on state, and to signal the set-top box device 102 that the television 104 has been powered-on.

The set-top box device 102 is adapted to signal the content source 106 to cease sending the content stream when the set-top box device 102 has received a low power state indicator from the external power interface 110. In an illustrative embodiment, the set-top box device 102 can be adapted to determine whether it is tuned to a digital music channel and to signal the content source 106 to cease sending the content stream when the set-top box device 102 is not tuned to a digital music channel (for example, because music may still be heard through other speakers or the set-top box device 102 when the television 104 is not powered-on). In another illustrative embodiment, the set-top box device 102 can be adapted to prompt a user to indicate whether the television 104 is in a powered-on state, in response to receiving the low power state indicator from the external power interface 110. The set-top box device 102 can be adapted to display a prompt via a display screen 118 or to send the prompt to the television 104. In another embodiment, the set-top box device 102 can be adapted to prompt a user to indicate whether the television 104 is coupled to the power outlet 112. If nothing is connected with the power outlet 112, or another device is coupled to the power outlet 112, and the television 104 is powered-on, the prompt can be displayed at the television 104 and the user can input a response. If the television is coupled to the power outlet 112 and is powered-off, the prompt will not be displayed and the user will not enter a response.

The set-top box device 102 is adapted to send a signal to the content source 106 indicating that the content source 106 is to cease sending the content stream to the set-top box device 102, after the set-top box device 102 determines that it has received input indicating that the television 104 is powered-off; has not received input indicating that the television 104 is powered-on within a response time; or has not received input indicating that the television 104 is coupled to the power outlet 112 within a response time. In one embodiment, the set-top box device 102 can be adapted to enter a standby mode, and the signal sent to the content source 106 can indicate that the set-top box device 102 has entered the standby mode.

In a particular embodiment, the set-top box device 102 can be adapted to receive a high power state indicator from the external power interface 110 indicating that a device coupled to the power outlet 112 has been powered-on. In response to the high power state indicator, the set-top box device 102 can be adapted to request a content stream from the content source 106, where the content stream is related to a default channel, a last channel to which the set-top box device 102 was tuned, or another channel. The set-top box device 102 can be adapted to exit a standby mode before requesting the content stream.

Figure 2:
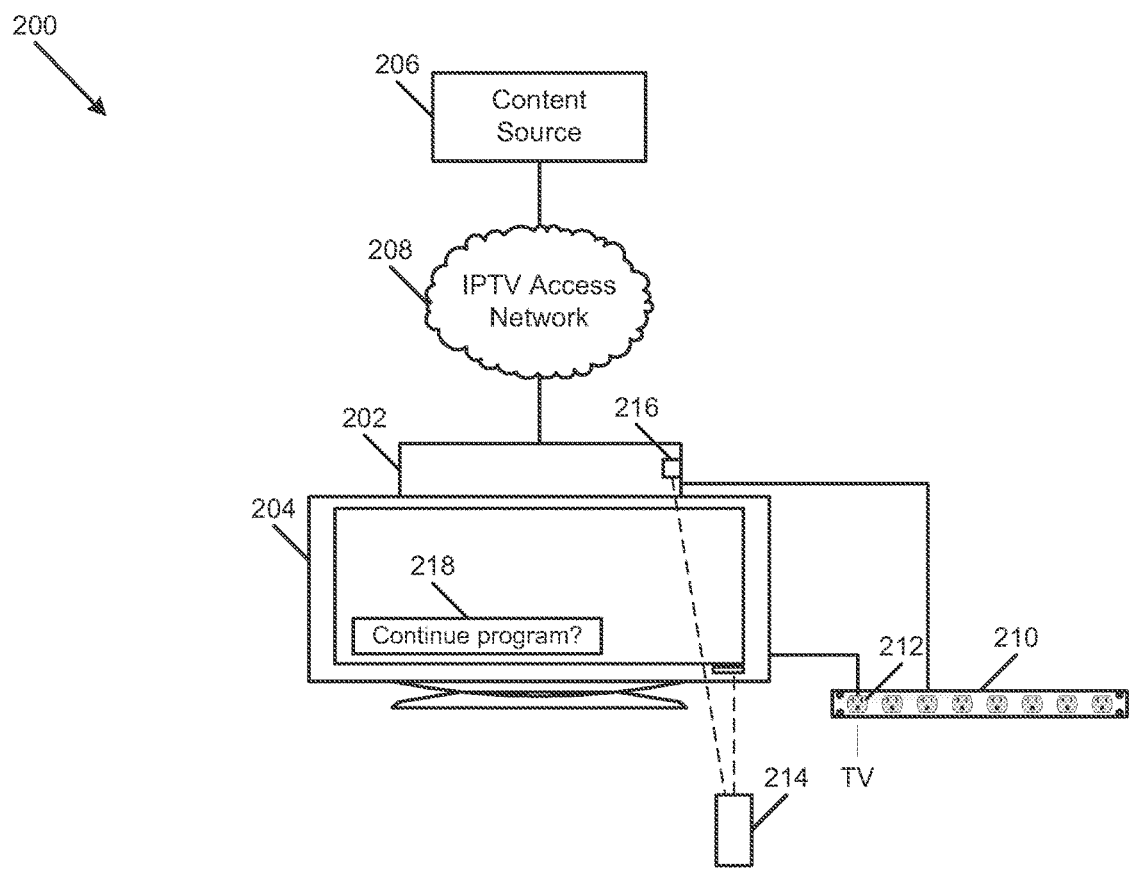
FIG. 2 is a block diagram illustrating another particular embodiment of a system to manage a content stream.

FIG. 2 illustrates another particular embodiment of a system 200 to manage a content stream. The system 200 includes a set-top box device 202 coupled to a display device, such as a television 204. The set-top box device 202 communicates with a content source 206 via a private access network, such as an IPTV access network 208. The system 200 also includes a power interface, such as the power strip 210, through which the television 204 can receive electrical power. The set-top box device 202 can also receive power via the power interface 210. The power interface 210 includes at least one power outlet 212 through which power to the television 204 can be monitored.

In a particular embodiment, the set-top box device 202 is adapted to receive a content stream from the content source 206 via the IPTV access network 204. The set-top box device 202 can be adapted to send the content stream to the television 204 after decoding the content stream, buffering the content stream, otherwise processing the content stream, or any combination thereof. Further, the set-top box device 202 is adapted to detect a power-off command issued by a remote control 214 associated with the television 204. For instance, the set-top box device 202 can include a sensor 216 that is adapted to detect a radio signal, an infrared signal, or another wireless signal transmitted by the remote control 214. The sensor 216 can be coupled to or integrated with the set-top box device 202. In another embodiment, the sensor 216 can be coupled to the power strip and can send power state information to the set-top box device 202 via a power cable coupled to the set-top box device 202 in response to detecting commands issued by the remote control device 214. In response to detecting the power-off command, the set-top box device is adapted to signal the content source 206 to cease sending a content stream to the set-top box device 202. The set-top box device can be adapted to enter a standby mode after signaling the content source 206 to cease sending the content stream.

The set-top box device 202 can be adapted to detect a power-on command issued by the remote control 214 and to request a content stream from the content source 206, such as a content stream associated with a default channel, a last channel to which the set-top box device 202 was tuned, or another channel. If the set-top box device 202 is in standby mode when it detects the power-on command, the set-top box device 202 can exit standby mode before requesting the content stream from the content source 206.

In another embodiment, the power-on and power-off commands can comprise power state toggle commands. The set-top box device 202 can be adapted to prompt a user via the television 204 to indicate whether the television 204 is powered-on, before requesting the content stream from the content source 206. The set-top box device 202 can be adapted to request the content stream when a particular key of the remote control device 214 is pressed and to not request the content stream when a selection of the particular key is not communicated to the set-top box device 202 within a response time.

Figure 3:
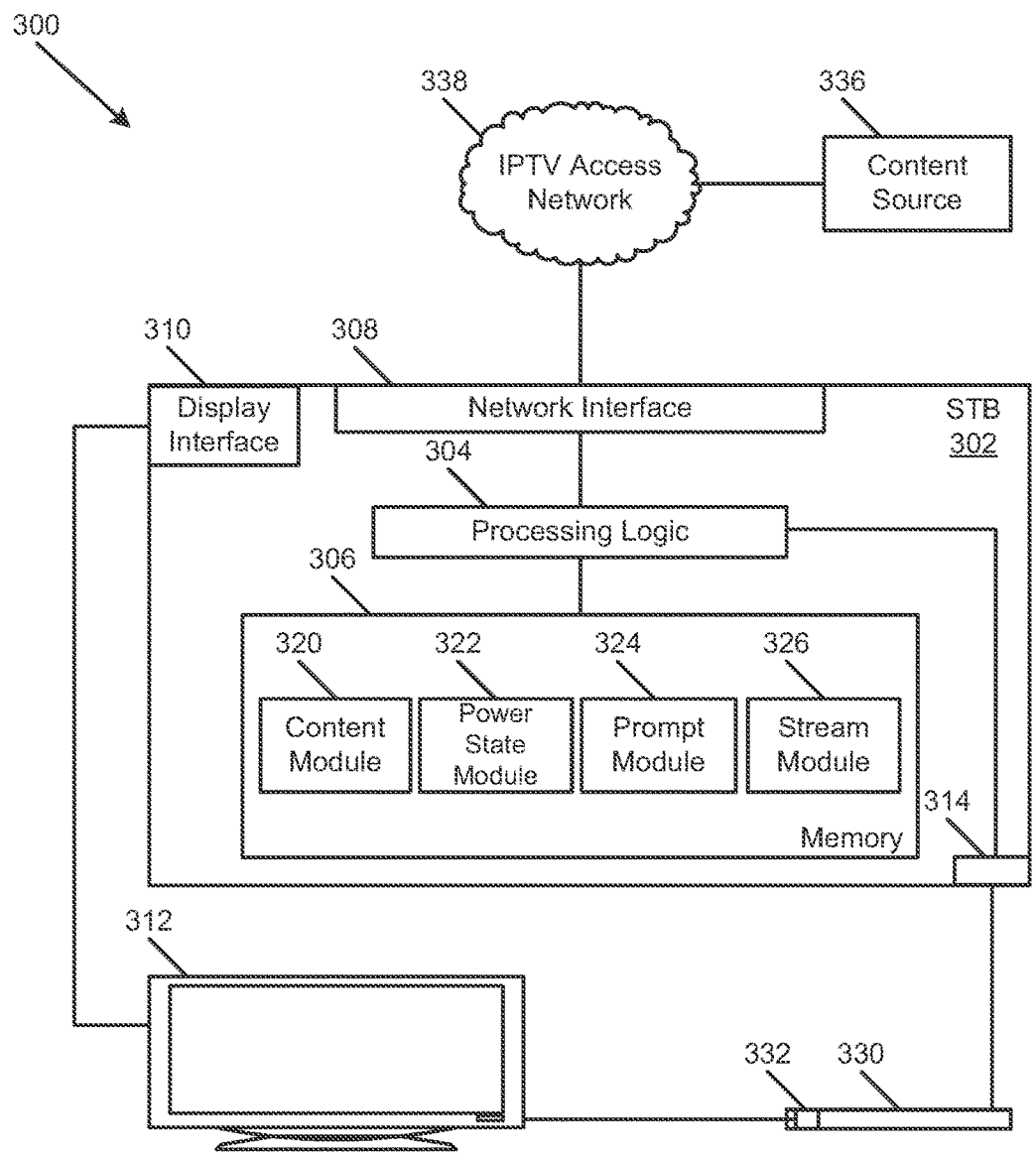
FIG. 3 is a block diagram illustrating an additional embodiment of a system to manage a content stream.

FIG. 3 illustrates an additional embodiment of a system 300 to manage a content stream. The system 300 includes a set-top box device 302 coupled to a display device, such as a television 312. The set-top box device 302 includes a network interface 308 that is adapted to facilitate communication between the set-top box device 302 and a content source 336, such as a video head-end of a video service provider, via a private access network, such as an IPTV access network 338. The system 300 also includes a power interface, such as the power strip 330, through which the television 312 can receive electrical power. The set-top box device 302 can also receive power via a power strip 330. The power strip 330 includes at least one power outlet 332 through which power to a device coupled to the power outlet 332 can be monitored. In the embodiment illustrated in FIG. 3, the power strip 330 can be adapted to communicate with a power cable interface 314 at the set-top box device 302.

The set-top box device 302 includes processing logic 304 and memory 306 accessible to the processing logic 304. In a particular embodiment, the memory 306 includes a plurality of modules 320-326. The modules 320-326 can include computer instructions that are readable and executable by the processing logic 304 to implement various functions of the set-top box device 302 with respect to managing a content stream. For example, the modules 320-326 can represent various aspects of one or more software applications, operating systems, or other computer programs. In other embodiments, the modules 320-326 can be implemented as hardware logic or a combination of hardware logic and computer instructions.

For example, the memory 306 can include a content module 320 that is executable by the processing logic 304 to receive a content stream from the content source 336 via the IPTV access network 338. The content module 320 can be executable by the processing logic 304 to send the content stream to the television 312 after decoding the content stream, buffering the content stream, otherwise processing the content stream, or any combination thereof.

The memory 306 also includes a power state module 322 that is executable by the processing logic 304 to determine whether the set-top box device 302 has received a low power state indicator via the power cable interface from the power strip 330, the low power state indicator indicating that a device coupled to the power outlet 332 has entered a low power state, such as a powered-off state, a standby state, an unplugged state or other low power state. In a particular embodiment, the power state module 322 can be executable by the processing logic 304 to receive a high power state indicator from the power strip 330 indicating that the television 312 has been powered-on. In the embodiment illustrated in FIG. 3, low power state indicators and high power state indicators can be received at the set-top box device 302 via the power cable interface 314, from the power strip 330.

The memory 306 also includes a prompt module 324 that is executable by the processing logic 304 to prompt a user to indicate whether the television 312 is in a powered-on state, in response to receiving the low power state indicator from the external power strip 330. In another embodiment, the prompt module 324 can be executable by the processing logic 304 to prompt the user to indicate whether the television 312 is coupled to the power outlet 332. Further, the prompt module 324 is executable by the processing logic 304 to determine whether the set-top box device 302 has received input indicating that the television 312 is powered-on. In one embodiment, the prompt module can be executable by the processing logic 304 to start a response timer concurrently with or after the prompt and to determine that the television 312 is powered-off if a response is not received before the response timer expires.

The memory 306 also includes a stream module 326 that is executable by the processing logic 304 to send a signal to the content source 336 to cease sending the content stream after the set-top box device 302 has received a low power state indicator from the power strip 330. In one embodiment, the stream module 326 can be executable by the processing logic 304 to activate a standby mode at the set-top box device 302. The stream module 326 can also be executable by the processing logic 304 to request a content stream from the content source 336 in response to receiving a high power state indicator from the power strip 330, where the content stream is related to a default channel, a last channel to which the set-top box device 302 was tuned, or another channel. The stream module 326 can be executable by the processing logic 304 to deactivate a standby mode before the content stream is requested.

Figure 4:
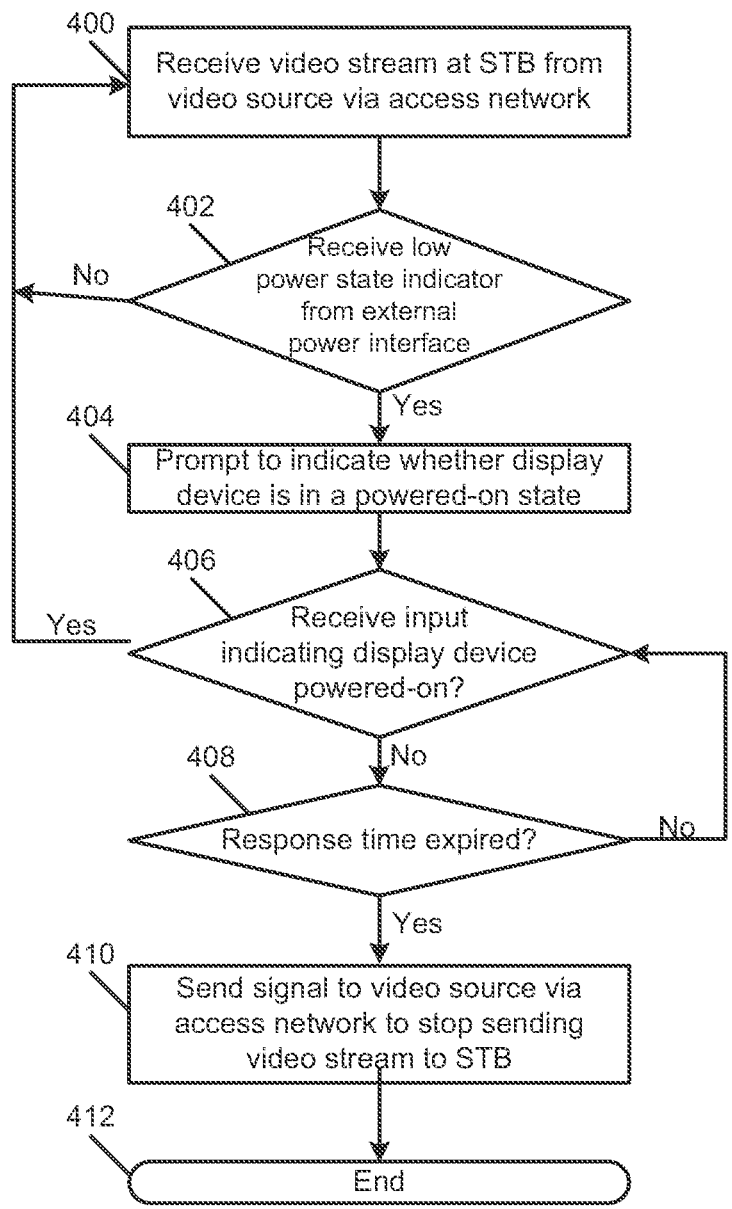
FIG. 4 is a flow diagram illustrating a particular embodiment of a method of managing a content stream.

FIG. 4 illustrates a particular embodiment of a method of managing a content stream. At block 400, a set-top box device receives a content stream from a content source via a private access network associated with a video distribution service. The set-top box device can send the content stream to a display device after decoding the content stream, buffering the content stream, otherwise processing the content stream, or any combination thereof. Moving to decision node 402, the set-top box device determines whether it has received a low power state indicator from an external power interface. The low power state indicator indicates that the display device coupled to the set-top box device has entered a low power state, such as a powered-off state, a standby state, an unplugged state or other low power state. In one embodiment, the low power state indicator can indicate a reduced current or power draw, an approximately zero power draw, or another indication that the display device has been powered off or has been placed in a standby mode, at an electrical outlet associated with the display device at the external power interface. The low power state indicator can be received from the external power interface via wireless signal or via a cable or other physical link between data ports at the set-top box device and external power interface.

If the set-top box device determines that it has not received a low power state indicator from the external power device, the method can return to block 400, and the set-top box device can continue receiving the content stream from the content source. Conversely, if the set-top box device determines that it has received a low power state indicator from the external power device, the method can proceed to block 404, and the set-top box device can prompt a user to indicate whether the display device is in a powered-on state. For example, the set-top box device can display the prompt via a display screen at the set-top box device.

Continuing to decision node 406, the set-top box device determines whether it has received input indicating that the display device is powered-on. If the set-top box device determines that it has received such input, the method returns to block 400. On the other hand, if the set-top box device determines that it has not received input indicating that the display device is powered-on, the method advances to decision node 408, and the set-top box device determines whether a response time has expired. If the response time has not expired, the method returns to decision node 406. Whereas, if the response time has expired, the method moves to block 410, and the set-top box device sends a signal to the content source indicating that the content source is to cease sending the content stream to the set-top box device. In one embodiment, the signal can indicate that the set-top box device has entered a standby mode. The method terminates at 412.

Figure 5:
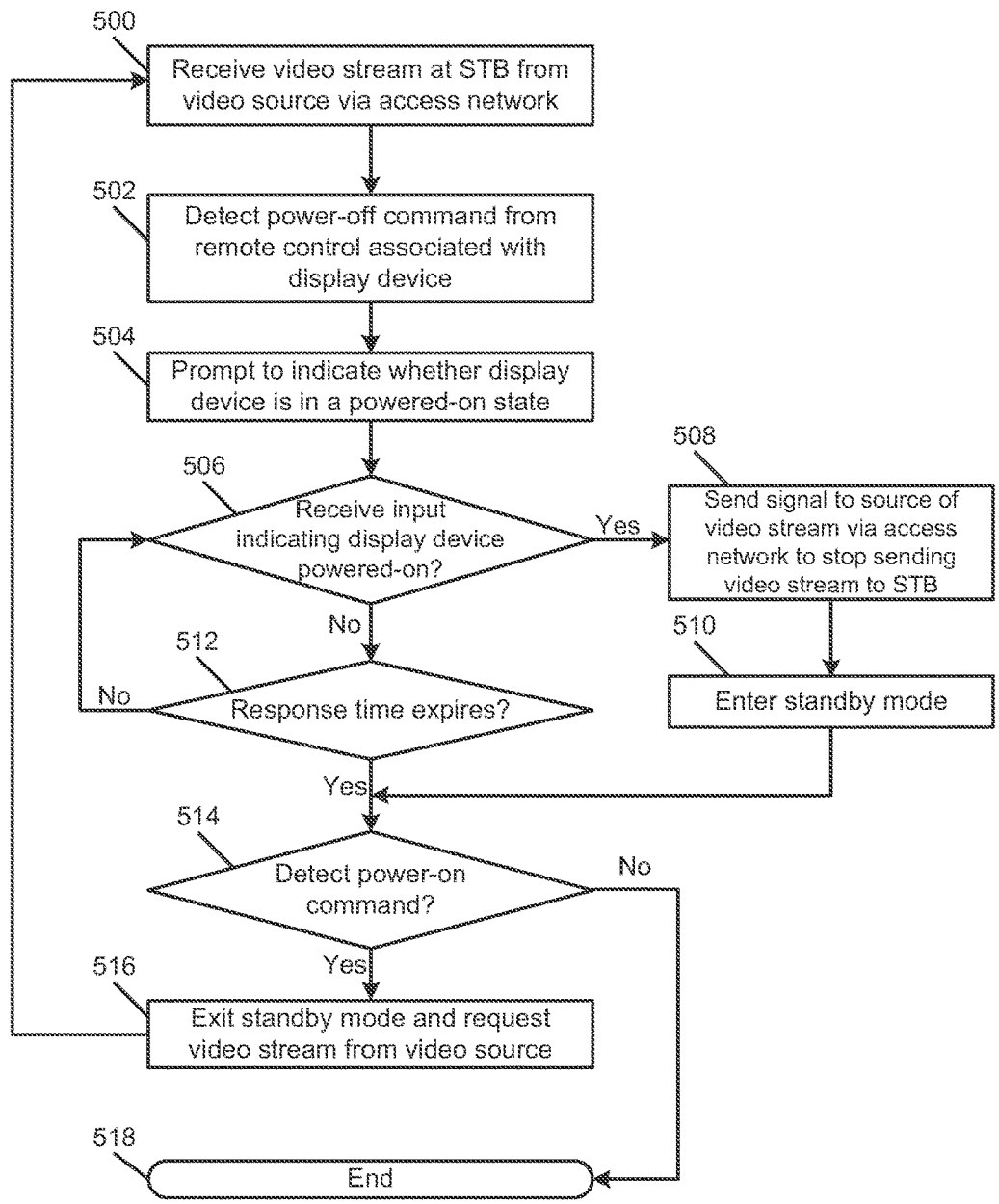
FIG. 5 is a flow diagram illustrating another particular embodiment of a method of managing a content stream.

FIG. 5 illustrates another particular embodiment of a method of managing a content stream. At block 500, a set-top box device receives a content stream from a content source via a private access network associated with a video distribution service. The set-top box device can send the content stream to a display device after decoding the content stream, buffering the content stream, otherwise processing the content stream, or any combination thereof. Moving to bock 502, the set-top box device detects a power-off command issued from a remote control associated with a display device coupled to the set-top box device. Proceeding to block 504, the set-top box device can prompt a user to indicate whether the display device is in a powered-on state. For example, the set-top box device can display the prompt via a display screen at the set-top box device.

Continuing to decision node 506, the set-top box device determines whether it has received input indicating that the display device is powered-on. If the set-top box device determines that it has received such input, the method advances to block 508, and the set-top box device sends a signal to the content source indicating that the content source is to cease sending the content stream to the set-top box device. At block 510, the set-top box device enters a standby mode, and the method moves to decision node 514.

Returning to decision node 506, if the set-top box device determines that it has not received input indicating that the display device is powered-on, the method advances to decision node 512, and the set-top box device determines whether a response time has expired. If the response time has not expired, the method returns to decision node 506. Whereas, if the response time has expired, the method moves to decision node 514, and the set-top box device determines whether it has detected a power-on command issued by the remote control associated with the display device coupled to the set-top box device. If the set-top box device detects a power-on command, the method proceeds to block 516, and the set-top box device can exit standby mode and request a content stream from the content source, such as a content stream associated with a default channel or a last channel to which the set-top box device was tuned. If the set-top box device does not detect a power-on command, the method can terminate at 518.

In some embodiments, the methods described herein can be performed as described. In other embodiments, various elements of the described methods can be performed in alternate sequences or simultaneously.

Figure 6:
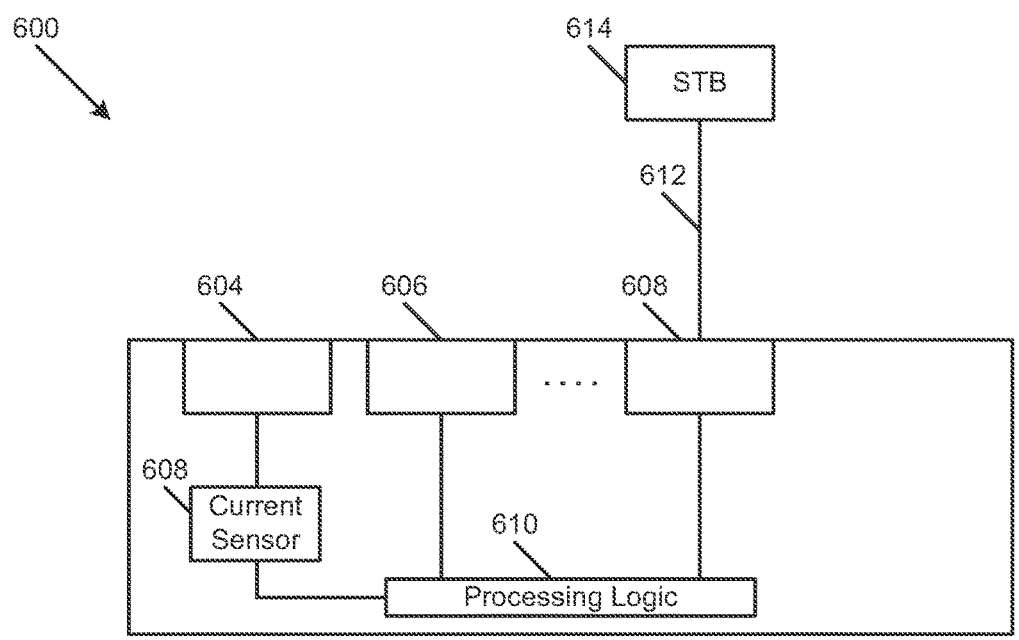
FIG. 6 is a block diagram illustrating a particular embodiment of an external power interface that can be used in conjunction with a system to manage a content stream.

FIG. 6 illustrates a particular embodiment of an external power interface 600 that can be used in conjunction with a system to manage a content stream, such as the system 100 illustrated in FIG. 1. The external power interface 600 includes one or more monitored power outlets, such as the power outlet 604 and one or more other power outlets, such as outlets 606 and 608. Each power outlet 604, 606 and 608 is adapted to receive a power cable, such as the power cable 612 coupled to the set-top box device 614, and to transmit power to a device via the power cable.

The power outlet 604 is coupled to a current sensor 608 that is adapted to detect an amount of electrical current drawn via the outlet 604. The current sensor 608 can include a current transducer, an alternating current (AC) line monitor, a direct current (DC) current sensor, an AC current sensor, another electrical current sensing device, or any combination thereof. The current sensor 604 is coupled to processing logic 610. The processing logic 610 is adapted to send a signal to the set-top box device 614 via the power cable 612 in response to the current sensor 608 detecting a zero current or power draw, a reduced current or power draw, or another indication of a low power state at equipment connected with the outlet 604. The signal sent to the set-top box device 614 can indicate the low power state. In one example, the signal can be sent via X10 protocol or another protocol adapted to send information via a power line.

In another embodiment, the processing logic 610 can be adapted to send another signal to the set-top box device 614 via the power cable 612 in response to the current sensor 608 detecting a positive current draw, an increased current draw, or another indication of a high power state at equipment connected with the outlet 604. The other signal sent to the set-top box device 614 can indicate the high power state.

Figure 7:
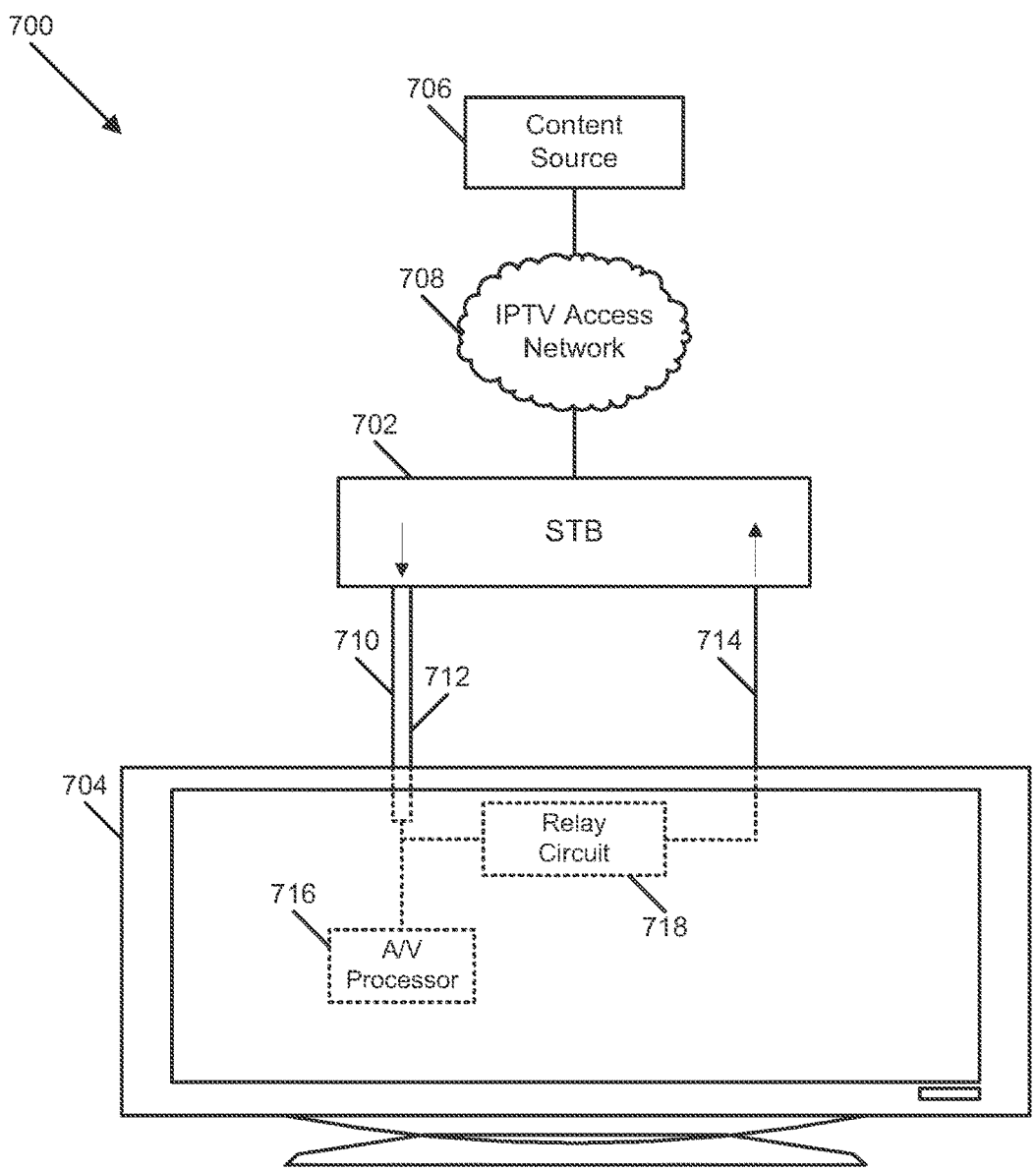
FIG. 7 is a block diagram illustrating a further embodiment of a system to manage a content stream.

FIG. 7 illustrates a further particular embodiment of a system 700 to manage a content stream. The system 700 includes a set-top box device 702 coupled to a display device 704, such as a television. The set-top box device 702 communicates with a content source 706 via an IPTV access network 708. In an illustrative embodiment, the set-top box device 702 is coupled to the display device 704 via an audio connector 710 and a video connector 712. In another embodiment, the audio connector 710 and video connector 712 can comprise a single connector, such as a single cable. The set-top box device 702 is adapted to send audio and video associated with a content stream received from the content source 706 to the display device 704 via the connectors 710 and 712. In one embodiment, the set-top box device 702 can be adapted to buffer the audio and video content, otherwise process the audio and video content, or a combination thereof, prior to sending the audio and video content to the display device 704.

The display device 704 can include an audio/video (A/V) processor 716 that is adapted to process audio and video received from the set-top box device 702, such that the audio and video content can be presented at the display device 704, for example, via a video screen, audio speakers, other presentation elements, or any combination thereof. In addition, the display device 704 includes a relay circuit 718 that is adapted to send audio, video, or a combination thereof that is received at the display device 704 back to the set-top box device 702 via an auxiliary return connector 714. The relay circuit 718 is adapted to relay a signal in response to power received from another circuit at the display device 704, such that the relay circuit sends audio, video or a combination thereof to the set-top box device 702 when the display device 704 is powered-on and not when the display device 704 is powered-off.

The set-top box device 702 is adapted to signal the content source 706 to cease sending a content stream when the set-top box device 702 detects that no content is received at the set-top box device 702 via the auxiliary return connector 714. For example, the set-top box device 702 can determine whether any content has been received via the auxiliary return connector 714 within a pre-determined period. If the set-top box device 702 determines that no content has been received via the auxiliary return connector 714 within the pre-determined period, the set-top box device can send data to the content source 706 indicating that the content source 706 is to cease sending content to the set-top box device 702.

In an illustrative embodiment, the set-top box device 702 can be adapted to determine whether it is tuned to a digital music channel and to signal the content source 706 to cease sending the content stream when the set-top box device 702 is not tuned to a digital music channel. In another illustrative embodiment, the set-top box device 702 can be adapted to prompt a user to indicate whether the display device 704 is in a powered-on state, in response to detecting that no content is received via the auxiliary return connector 714. The set-top box device 702 can be adapted to send a signal to the content source 706 indicating that the content source 706 is to cease sending the content stream to the set-top box device 702, after the set-top box device 702 has received input indicating that the display device 704 is powered-off or has not received input indicating that the display device 704 is powered-on within a response time.

Figure 8:
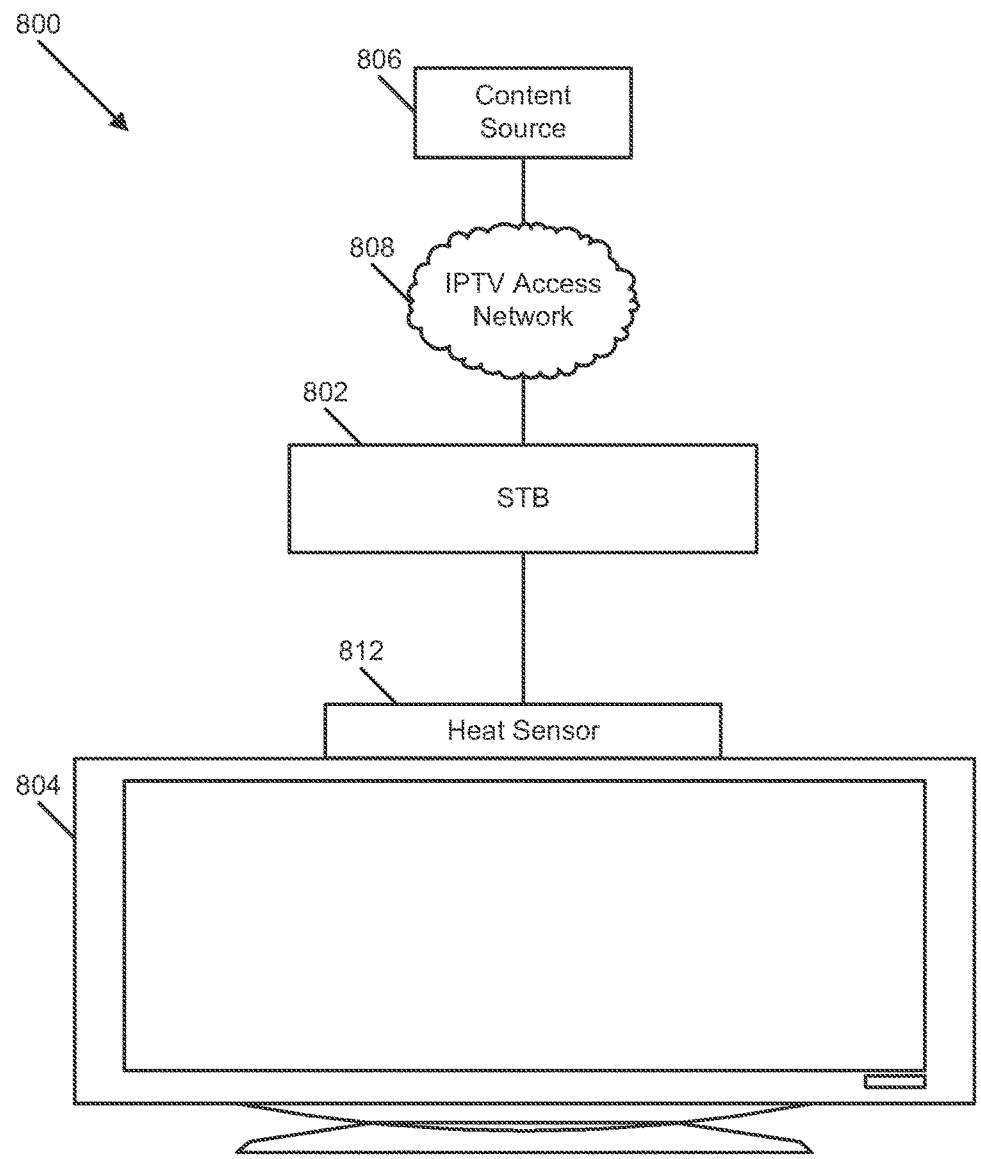
FIG. 8 is a block diagram illustrating yet another embodiment of a system to manage a content stream.

FIG. 8 illustrates yet another particular embodiment of a system 800 to manage a content stream. The system 800 includes a set-top box device 802 coupled to a display device 804, such as a television. The set-top box device 802 communicates with a content source 806 via an IPTV access network 808. The set-top box device 802 is adapted to send audio and video associated with a content stream received from the content source 806 to the display device 804. In an illustrative embodiment, the set-top box device 802 is coupled to a heat sensor 812 at the display device 804. The heat sensor 812 can include a heat flux sensor or other transducer that is adapted to produce a signal when the chassis of the display device 804 exceeds or falls below a temperature, when air emitted at or near vents of the display device 804 exceeds or falls below a temperature, when another emission of the display device 804 exceeds or falls below a temperature, or any combination thereof.

The set-top box device 802 is adapted to determine whether the display device 804 is powered-on or powered-off based on a signal received from the heat sensor 812. For example, where the heat sensor 812 is adapted to produce a signal when it detects an emission above a temperature, the set-top box device 802 can be adapted to determine that the display device 804 has been powered-off when a signal has not been received from the heat sensor 812 within a predetermined period. In another example, where the heat sensor is adapted to produce a signal when it detects an emission that is below a temperature, the set-top box device 802 can be adapted to determine that the display device 804 is powered-off when it receives a signal from the heat sensor 812.

The set-top box device 802 is adapted to signal the content source 806 to cease sending a content stream when the set-top box device 802 determines that the display device 804 is powered-off. In one embodiment, the set-top box device 802 can be adapted to prompt a user to confirm whether the display device 804 is in a powered-on state, in response to preliminarily determining that the display device 804 is powered-off. The set-top box device 802 can be adapted to send a signal to the content source 806 indicating that the content source 806 is to cease sending the content stream to the set-top box device 802, after the set-top box device 802 has received input indicating that the display device 804 is powered-off or has not received input indicating that the display device 804 is powered-on within a response time.

In a particular embodiment, the set-top box device 802 can be adapted to determine that the display device 804 is powered-on based on a signal received from the heat sensor 812 (or based on not receiving a signal from the heat sensor 812 within a predetermined period) and, in response, to request a content stream from the content source 806, where the content stream is related to a default channel, a last channel to which the set-top box device 802 was tuned, or another channel.

Figure 9:
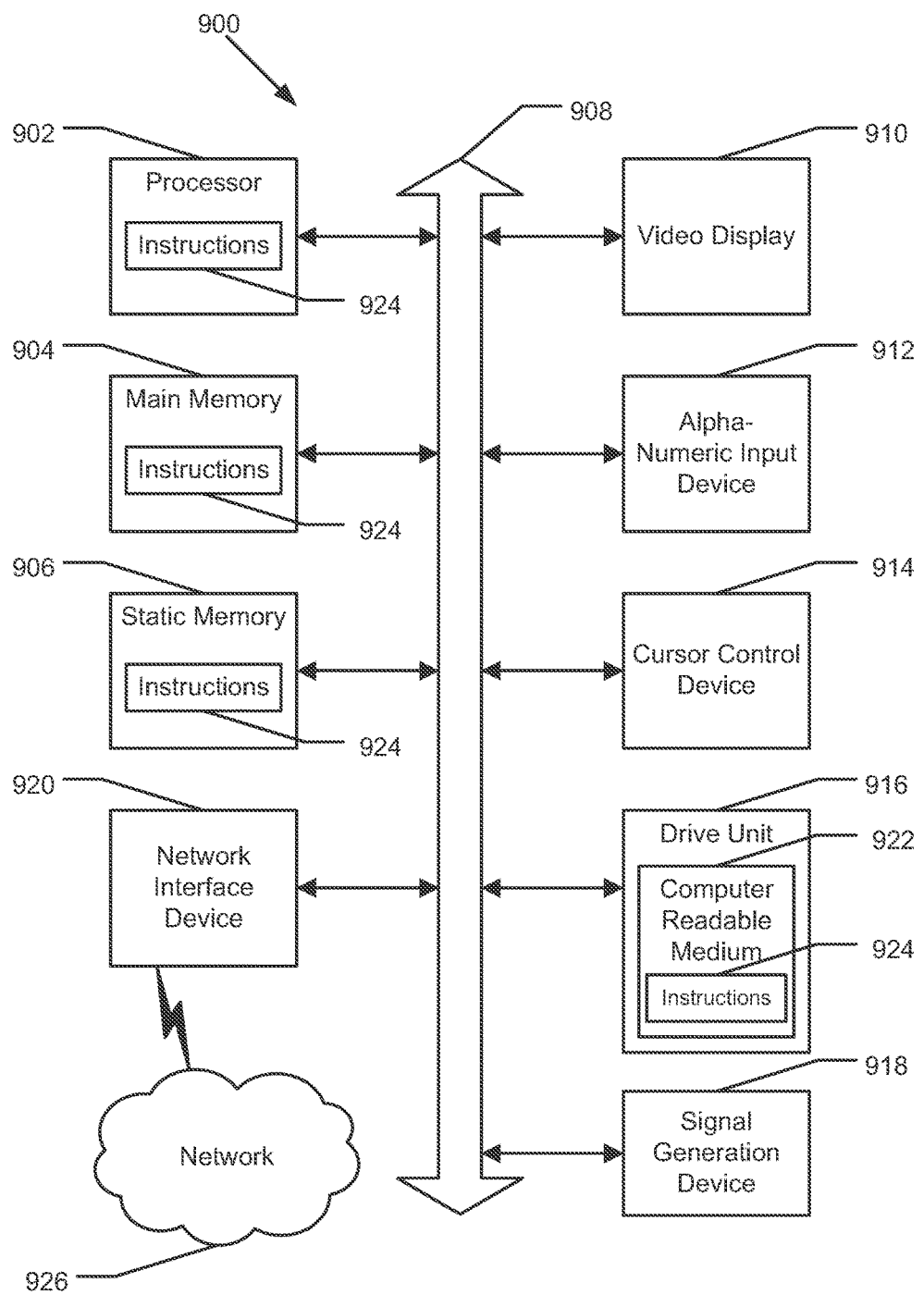
FIG. 9 is a block diagram illustrating a particular embodiment of a general computer system.

FIG. 9 is a block diagram illustrating a particular embodiment of a general computer system. The computer system 900 may operate as a standalone device or may be connected, e.g., using a network, to other computer systems or peripheral devices. In an illustrative embodiment, such standalone and peripheral devices can include, for example, set-top box devices, content sources, other network elements, or any combination thereof, as illustrated in FIGS. 1-3.

In a networked deployment, the computer system may operate in the capacity of a server or as a client user computer in a server-client user network environment, or as a peer computer system in a peer-to-peer (or distributed) network environment. The computer system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

The computer system 900 may include a processor 902, e.g., a central processing unit (CPU), a graphics processing unit (GPU), or both. Moreover, the computer system 900 can include a main memory 904 and a static memory 906 that can communicate with each other via a bus 908. As shown, the computer system 900 may further include a video display unit 910, such as a liquid crystal display (LCD), an organic light emitting diode (OLED), a flat panel display, a solid state display, or a cathode ray tube (CRT). Additionally, the computer system 900 may include an input device 912, such as a keyboard, and a cursor control device 914, such as a mouse. The computer system 900 can also include a disk drive unit 916, a signal generation device 918, such as a speaker or remote control, and a network interface device 920.

In a particular embodiment as depicted in FIG. 9, the disk drive unit 916 may include a computer-readable medium 922 in which one or more sets of instructions 924, e.g. software, can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the computer system 900. The main memory 904 and the processor 902 also may include computer-readable media. The network interface device 920 can provide connectivity to a network 926, e.g., a wide area network (WAN), a local area network (LAN), or other network.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 924 or receives and executes instructions 924 responsive to a propagated signal, so that a device connected to a network 926 can communicate voice, video or data over the network 926. Further, the instructions 924 may be transmitted or received over the network 926 via the network interface device 920.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile rewritable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein In accordance with the embodiments disclosed herein, a system and method to manage a content stream are provided, in which a set-top box device signals a content source to cease sending a content stream to the set-top box device in response to receiving an indication that a low power state at a display device has been detected by an external power interface. By signaling the source of the content stream to cease sending the content stream, the content stream's portion of total bandwidth allotted to the customer premises can be used for other services provided at the customer premises, such as Internet service, phone service, or other network services. Additionally, the set-top box device can use less power when the display device is powered-off by entering a standby mode, even where a user does not power-off the set-top box device. Further, the bandwidth savings can have positive effects on upstream resources, such as an IPTV access network that serves multiple customer premises.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method, comprising:
   receiving, by a processing system comprising a processor, a content stream from a content source of an interactive television network, wherein the content stream includes video content;
   transmitting, by the processing system, the video content to a display device associated with the processing system;
   receiving, by the processing system, a return signal from the display device indicating that the display device is in an on-state, wherein the return signal comprises at least a portion of the video content included in the content stream;
   subsequent to the receiving of the return signal, providing, by the processing system, a cease streaming signal to the content source responsive to receiving a first indication from a first auxiliary feedback signal from the display device indicating that the display device is in an off-state;
   entering, by the processing system, a stand-by mode responsive to the providing the cease streaming signal;
   exiting, by the processing system, the stand-by mode after receiving a second indication from a second auxiliary feedback signal from the display device that the display device is in the on-state; and
   sending, by the processing system, a request to the content source to resume transmission of the content stream responsive to receiving the second indication that the display device is in the on-state.

2. The method of claim 1, further comprising determining that the display device is in the off-state by detecting a power-off command for the display device.

3. The method of claim 2, wherein the power-off command is received from a remote control device associated with the display device.

4. The method of claim 1, further comprising:
   displaying a prompt requesting a confirmation input on the display device; and
   determining that the confirmation input, responsive to the prompt, has not been received.

5. The method of claim 4, wherein the determining comprises waiting for a predetermined period of time to receive the confirmation input before determining that the confirmation input has not been received.

6. The method of claim 4, further comprising rescinding the signal to the content source responsive to receiving the confirmation input.

7. The method of claim 4, wherein the determining the display device is active comprises detecting a power-on command for the display device.

8. A non-transitory, machine-readable storage medium comprising executable instructions that, when executed by a processing system including a processor, facilitate performance of operations, comprising:
   providing media content from a content stream provided by a source device to a display device, wherein the media content includes video content, wherein the display device provides a first auxiliary feedback signal indicating that the media content is being received while the display device is in a power-on state, and wherein the first auxiliary feedback signal comprises at least a portion of the video content included in the media content;
   directing the source device to cease sending the content stream responsive to determining that the display device is in a power-off state responsive to receiving a second auxiliary feedback signal from the display device indicating that the display device is in an off-state; and
   directing the source device to resume providing the content stream responsive to determining that the display device has returned to the power-on state.

9. The non-transitory, machine-readable storage medium of claim 8, wherein the video content is from an interactive television network.

10. The non-transitory, machine-readable storage medium of claim 8, wherein the determining that the display device is in the power-off state further comprises displaying a prompt on the display device, wherein the prompt comprises an instruction to confirm that the display device is in the power-on state via a confirmation input.

11. The non-transitory, machine-readable storage medium of claim 10, wherein the operations further comprise, responsive to determining that the confirmation input has not been received, determining that the display device is in the power-off state.

12. The non-transitory, machine-readable storage medium of claim 10, wherein the determining comprises waiting for a predetermined period of time to receive the confirmation input before determining that the confirmation input has not been received.

13. The non-transitory, machine-readable storage medium of claim 8, wherein the determining that the display device is in a power-off state comprises detecting that a value of a power threshold of power supplied to the display device is less than a predetermined value.

14. The non-transitory, machine-readable storage medium of claim 13, wherein the determining that the display device is in the power-on state comprises detecting that the value of the power threshold of power supplied to the display device exceeds the predetermined value.

15. A device, comprising:
   a processing system including a processor; and
   a memory that stores executable instructions that, when executed by the processing system, facilitate performance of operations, comprising:
      receiving a content stream from an interactive television network, wherein the content stream includes video content;
      transmitting the video content to a display device associated with the device;
      receiving a return signal from the display device indicating that the display device is in an on-state, wherein the return signal comprises at least a portion of the video content included in the content stream;
      subsequent to the receiving of the return signal, providing a cease streaming signal to the interactive television network responsive to receiving a first auxiliary feedback signal from the display device providing a first indication that the display device is in an off-state;
      receiving a second auxiliary feedback signal from the display device providing a second indication that the display device is in the on-state; and sending a request to the interactive television network to resume transmission of the content stream responsive to receiving the second indication that the display device is in the on-state.

16. The device of claim 15, wherein the second indication is provided responsive to detecting that a value of a power threshold of power supplied to the display device is greater than a predetermined value.

17. The device of claim 15, wherein the first indication is provided after displaying a prompt on the display device, wherein the prompt requests a confirmation input, determining that the confirmation input has not been received, and responsive to the determining that the confirmation input has not been received, performing the sending the cease streaming signal to the interactive television network.

18. The device of claim 15, wherein the operations further comprise entering a stand-by mode responsive to the providing the cease streaming signal.

19. The device of claim 18, wherein the operations further comprise exiting the stand-by mode responsive to receiving the second indication.

20. The device of claim 15, wherein the first indication that the display device is in the off-state is in accordance with a power-off command for the display device.

* * * * *